(12) United States Patent
Yashiro et al.

(10) Patent No.: US 11,344,948 B2
(45) Date of Patent: May 31, 2022

(54) METHOD FOR PRODUCING MACHINE COMPONENT

(71) Applicant: NTN CORPORATION, Osaka (JP)

(72) Inventors: Naoki Yashiro, Mie (JP); Kouya Oohira, Mie (JP)

(73) Assignee: NTN CORPORATION, Osaka (JP)

( * ) Notice: Subject to any disclaimer, the term of this patent is extended or adjusted under 35 U.S.C. 154(b) by 921 days.

(21) Appl. No.: 16/078,786

(22) PCT Filed: Mar. 1, 2017

(86) PCT No.: PCT/JP2017/008087
§ 371 (c)(1),
(2) Date: Aug. 22, 2018

(87) PCT Pub. No.: WO2017/150604
PCT Pub. Date: Sep. 8, 2017

(65) Prior Publication Data
US 2021/0308760 A1    Oct. 7, 2021

(30) Foreign Application Priority Data

Mar. 3, 2016  (JP) .............................. JP2016-040914
Mar. 30, 2016  (JP) .............................. JP2016-069140

(51) Int. Cl.
*B22F 3/11*    (2006.01)
*B22F 3/24*    (2006.01)
(Continued)

(52) U.S. Cl.
CPC .............. *B22F 3/1143* (2013.01); *B22F 1/10* (2022.01); *B22F 1/16* (2022.01); *B22F 3/11* (2013.01);
(Continued)

(58) Field of Classification Search
CPC ........ B22F 3/1143; B22F 1/0059; B22F 1/02; B22F 3/11; B22F 3/24; B22F 5/106;
(Continued)

(56) References Cited

U.S. PATENT DOCUMENTS 6,485,579 B1    11/2002  Nillius et al.
2008/0206497 A1*  8/2008  Hachiga .................... B28B 1/24
                                                   428/34.5
(Continued)

FOREIGN PATENT DOCUMENTS

JP    51-144313    12/1976
JP    57-63602     4/1982
(Continued)

OTHER PUBLICATIONS

JPS5763602Aenglish translation (Year: 1984).*
(Continued)

*Primary Examiner* — Anthony J Zimmer
*Assistant Examiner* — Ricardo D Morales
(74) *Attorney, Agent, or Firm* — Wenderoth, Lind & Ponack, L.L.P.

(57) ABSTRACT

Provided is a method of manufacturing a machine part having a radial crushing strength of 120 MPa or more, including: a compression molding step of compressing raw material powder including, as a main component, metal powder that is capable of forming an oxide coating and has a pure iron powder content ratio of 95 mass % or more, to thereby obtain a green compact (10) having a predetermined shape; and a coating forming step of causing the metal powder to react with an oxidizing gas while heating the green compact (10) at a temperature lower than a sintering temperature of the metal powder in an oxidizing gas atmo-
(Continued)

sphere, to thereby obtain a reinforced green compact (11) in which the oxide coating (5) is formed between particles of the metal powder.

14 Claims, 7 Drawing Sheets

(51) Int. Cl.
*B22F 5/10* (2006.01)
*F16C 17/10* (2006.01)
*B22F 1/10* (2022.01)
*B22F 1/16* (2022.01)
*B22F 3/02* (2006.01)

(52) U.S. Cl.
CPC ............ *B22F 3/24* (2013.01); *B22F 5/106* (2013.01); *F16C 17/10* (2013.01); *B22F 2003/023* (2013.01); *B22F 2003/242* (2013.01); *B22F 2003/247* (2013.01); *B22F 2003/248* (2013.01); *B22F 2998/10* (2013.01); *F16C 2220/20* (2013.01)

(58) Field of Classification Search
CPC .......... B22F 2003/023; B22F 2003/242; B22F 2003/247; B22F 2003/248; B22F 2998/10; F16C 17/10; F16C 2220/20
See application file for complete search history.

(56) References Cited

U.S. PATENT DOCUMENTS

2009/0042051 A1* 2/2009 Skarman .................. B22F 3/02
428/548
2016/0311026 A1 10/2016 Yashiro et al.

FOREIGN PATENT DOCUMENTS

| | | | |
|---|---|---|---|
| JP | S5763602 A * | 4/1982 | ............ B22F 3/1143 |
| JP | 63-072803 | 4/1988 | |
| JP | 02-057604 | 2/1990 | |
| JP | 04-136104 | 5/1992 | |
| WO | 99/03622 | 1/1999 | |
| WO | 2006/135324 | 12/2006 | |
| WO | 2015/098407 | 7/2015 | |

OTHER PUBLICATIONS

Conesa et al. ("Polytetrafluoroethylene decomposition in air and nitrogen." Polymer Engineering & Science 41.12 (2001): 2137-2147.). (Year: 2001).*
International Search Report dated May 9, 2017 in International (PCT) Application No. PCT/JP2017/008087.
Extended European Search Report dated Oct. 17, 2019 in corresponding European Patent Application No. 17760068.1.
International Preliminary Report on Patentability and Written Opinion of the International Searching Authority dated Sep. 4, 2018 in International (PCT) Application No. PCT/JP2017/008087.

* cited by examiner

METHOD FOR PRODUCING MACHINE COMPONENT

TECHNICAL FIELD

The present invention relates to a method of manufacturing a machine part, and more specifically, to a method of manufacturing a machine part (machine part made of a porous metal) comprising, as a base material, a green compact of raw material powder comprising, as a main component, metal powder.

BACKGROUND ART

For example, as a slide bearing that is one kind of machine parts, a so-called oil-impregnated bearing, which is formed of a porous body having an infinite number of inner pores impregnated with a lubricant, such as lubricating oil, has been suitably used. Such slide bearing is obtained through, for example, a compression molding step of obtaining a green compact of raw material powder including metal powder as a main component, a strength increasing treatment step of subjecting the green compact to strength increasing treatment, and an oil-impregnating step of impregnating lubricating oil into inner pores of the green compact in the stated order. As the above-mentioned strength increasing treatment, for example, sintering treatment of bonding particles of the metal powder to each other through necking has been widely adopted.

In the above-mentioned sintering treatment, it is required to heat the green compact at high temperature equal to or higher than the sintering temperature of the metal powder constituting the green compact. Accordingly, in a sintered compact obtained after the treatment, degradation in dimension and shape accuracy of portions of the sintered compact is liable to occur due to thermal expansion and contraction. Thus, in order to secure the dimension accuracy of portions of the sintered compact at a level of enabling actual use of the sintered compact as a machine part, it is essential to additionally perform dimension correcting processing, such as sizing, to the sintered compact. However, in this case, the manufacturing cost for the machine part increases by the increased number of steps.

In view of the foregoing, as the strength increasing treatment, for example, steam treatment described in Patent Literature 1 described below is adopted instead of the sintering treatment in some cases. The stream treatment is treatment of causing the metal powder constituting the green compact (metal powder capable of forming an oxide coating) to react with water vapor while heating the green compact (atmosphere), to thereby form an oxide coating on surfaces of particles (between particles) of the metal powder, and the oxide coating replaces a role of necking in bonding the metal particles. The steam treatment involves a treatment temperature which is remarkably lower than that of the sintering treatment, thereby being capable of reducing the amount of change in dimension of the green compact in association with thermal expansion and contraction. Thus, the steam treatment has an advantage in that the dimension correcting processing after the treatment can be omitted.

CITATION LIST

Patent Literature 1: JP 63-72803 A

SUMMARY OF INVENTION

Technical Problem

The method disclosed in Patent Literature 1 is useful in that a machine part made of a porous metal can be manufactured at relatively low cost. However, according to the verification made by the inventors of the present invention, it has been found that, unless the composition of powder for forming a green compact, and the like are made proper, there is a high risk in that a mechanical strength (for example, a radial crushing strength of 120 MPa or more), dimension accuracy, and surface properties (surface accuracy) at a level of enabling actual use cannot be obtained.

In view of the foregoing, the present invention has an object to manufacture a machine part made of a porous metal having desired mechanical strength, dimension accuracy, surface properties, and the like at low cost.

Solution to Problem

According to a first aspect of the present invention which has been devised to achieve the above-mentioned object, there is provided a method of manufacturing a machine part having a radial crushing strength of 120 MPa or more, comprising: a compression molding step of compressing raw material powder comprising, as a main component, metal powder that is capable of forming an oxide coating and has a pure iron powder content ratio of 95 mass % or more, to thereby obtain a green compact having a predetermined shape; and a coating forming step of causing the metal powder to react with an oxidizing gas while heating the green compact at a temperature lower than a sintering temperature of the metal powder in an oxidizing gas atmosphere, to thereby obtain a reinforced green compact in which the oxide coating is formed between particles of the metal powder. The "radial crushing strength" as used herein is a value which is calculated based on a method defined in JIS Z 2507.

According to the above-mentioned first aspect of the present invention, the oxide coating formed between the particles of the metal powder by coating forming treatment described above functions as a bonding medium for the particles to replace a role of necking which is formed when the green compact is sintered. Thus, the strength of the green compact (reinforced green compact) can be increased to a level of enabling direct use of the green compact as a predetermined machine part, specifically, to a level having a radial crushing strength of 120 MPa or more. Further, a machine part excellent in surface properties, specifically, a machine part in which a level difference between a protrusion and a recess in each surface is improved to less than 3 μm can be obtained by forming the oxide coating through a reaction of the metal powder (pure iron powder) with the oxidizing gas instead of steam treatment of causing the metal powder to react with water vapor.

Further, the coating forming treatment is performed by heating the green compact at a temperature lower than the sintering temperature of the metal powder, and hence the amount of change in dimension before and after the treatment can be reduced. Therefore, dimension correcting processing, such as sizing, which is essential after the sintering when the green compact is sintered, can be omitted. Further, when the amount of change in dimension can be reduced, a molding die for the green compact can easily be designed. Further, when the treatment temperature is low, energy required at the time of the treatment can also be reduced, thereby reducing treatment cost. As described above, according to the first aspect of the present invention, a machine part made of a porous metal having a mechanical strength, dimension accuracy, surface properties, and the like at a level of enabling actual use can be manufactured at low cost.

In the above-mentioned first aspect of the present invention, it is preferred that the raw material powder comprise a solid lubricant for improving moldability and releasability of the green compact. In this case, it is preferred that a degreasing step of removing the solid lubricant included in the green compact be provided between the compression molding step and the coating forming step, and further, it is preferred that the degreasing step be performed in a non-oxidizing atmosphere. This is because, when the degreasing step is performed in an oxidizing atmosphere, it becomes difficult to ensure dimension accuracy and surface properties required for the reinforced green compact (machine part).

Further, the inventors of the present invention have made extensive investigations, and as a result, have found that a machine part made of a porous metal having desired mechanical strength, dimension accuracy, surface properties, and the like can be manufactured at low cost by specifying the treatment conditions of the forming treatment for the oxide coating and allowing powder for forming a green compact (raw material powder) to comprise a particular solid lubricant, thereby devising a second aspect of the present invention.

That is, according to the second aspect of the present invention which has been devised to achieve the above-mentioned object, there is provided a method of manufacturing a machine part made of a porous metal, comprising: a compression molding step of compressing raw material powder comprising: as a main component, metal powder that is capable of forming an oxide coating; and a solid lubricant, to thereby obtain a green compact having a predetermined shape; a degreasing step of removing the solid lubricant included in the green compact; and a coating forming step of causing the metal powder to react with an oxidizing gas while heating the green compact after being subjected to degreasing treatment at a temperature lower than a sintering temperature of the metal powder in an oxidizing gas atmosphere, to thereby obtain a reinforced green compact in which the oxide coating is formed between particles of the metal powder, the solid lubricant being free of a metal component and formed of an element selected from the group consisting of C, H, O, N, P, S, and halogen group elements, having a decomposition temperature of less than 500° C., and having a decomposition rate in the degreasing step of 95% or more in mass fraction.

The "halogen group elements" as used in the above-mentioned second aspect of the present invention is a generic name for elements belonging to group 17 in the periodic table, specifically, for fluorine (F), chlorine (Cl), bromine (Br), iodine (I), and astatine (At).

According to the above-mentioned configuration, the oxide coating formed between the particles of the metal powder by coating forming treatment functions as a bonding medium for the particles to replace a role of necking which is formed when the green compact is sintered. Thus, the reinforced green compact is enabled to have a mechanical strength at a level of enabling use of the reinforced green compact as a predetermined machine part, specifically, a strength of a radial crushing strength of 120 MPa or more. Further, a reinforced green compact (machine part) excellent in surface properties, specifically, a machine part in which a level difference between a minute protrusion and a minute recess present in each surface mainly due to variations in thickness of the oxide coating is improved to less than 3 µm can be obtained by adopting, as the forming treatment for the oxide coating, the treatment of causing the metal powder to react with an oxidizing gas instead of the steam treatment of causing the metal powder to react with water vapor. Further, through selective use of a solid lubricant satisfying the above-mentioned various conditions as the solid lubricant to be included in the raw material powder, even when the degreasing treatment is performed at a low temperature capable of minimizing the energy consumption and the amount of change in dimension of the green compact in association with the degreasing treatment, the solid lubricant can be appropriately decomposed and removed, and a residue derived from the solid lubricant can be prevented from remaining in the reinforced green compact. Also in this respect, a reinforced green compact excellent in surface properties, and by extension, a machine part excellent in surface properties can be obtained.

Further, the above-mentioned coating forming treatment is performed by heating the green compact at a temperature lower than the sintering temperature of the metal powder, and hence the amount of change in dimension of the green compact before and after the treatment can be reduced. Therefore, the dimension correcting processing, such as sizing, which is essential after the sintering when the green compact is sintered, can be omitted. Further, when the amount of change in dimension can be reduced, a molding die for the green compact can be easily designed. Further, when the treatment temperature is low, energy required at the time of the treatment can also be reduced, thereby reducing treatment cost.

As described above, according to the second aspect of the present invention, a machine part having a mechanical strength, dimension accuracy, surface properties, and the like at a level of enabling actual use can be manufactured at low cost.

As the solid lubricant which satisfies the above-mentioned various conditions and can be preferably adopted in the second aspect of the present invention, there may be given a fatty acid amide (saturated fatty acid amide), such as stearic acid amide.

It is preferred that the degreasing step in the second aspect of the present invention be performed in a non-oxidizing atmosphere, for example, a nitrogen atmosphere, a reducing atmosphere, or a vacuum. This is because, when the degreasing step is performed in an oxidizing atmosphere, it becomes difficult to ensure dimension accuracy and surface properties required for a machine part.

In the above-mentioned configurations, when the density of the green compact is excessively high, there is a fear in that it becomes difficult to cause metal particles present in a core portion of the green compact to react with the oxidizing gas at the time of the coating forming treatment, that is, it becomes difficult to form the oxide coating which contributes to improvement in strength of the green compact in the core portion of the green compact. Conversely, when the density of the green compact is excessively low, there is a fear in that the operatability of the green compact is degraded and in that an inter-particle distance of the metal powder is increased to cause difficulty in formation of the oxide coating in a predetermined form. Thus, it is preferred that the density of the green compact be 5.8 g/cm$^3$ or more and 7.2 g/cm$^3$ or less.

It is preferred that the heating temperature of the green compact in the coating forming step be set to 350° C. or more and less than 700° C. Further, it is preferred that the treatment time in the coating forming step be set to 60 minutes or less.

In the above-mentioned configurations, an oil-impregnating step of impregnating lubricating oil into inner pores of the reinforced green compact can be further provided.

In the compression molding step, a bearing surface for supporting a shaft to be supported can be formed on the green compact, and the bearing surface may comprise a dynamic pressure generating portion formed through die molding. That is, the present invention can be preferably applied, for example, as a method of manufacturing a slide bearing formed of a porous body, and further, a dynamic pressure bearing that is one kind of slide bearings.

Advantageous Effects of Invention

As described above, according to the present invention, the machine part having a mechanical strength, dimension accuracy, and surface properties at a level of enabling actual use can be manufactured at low cost.

DESCRIPTION OF EMBODIMENTS

Now, an embodiment of a first aspect of the present invention is described with reference to the drawings.

Figure 1:
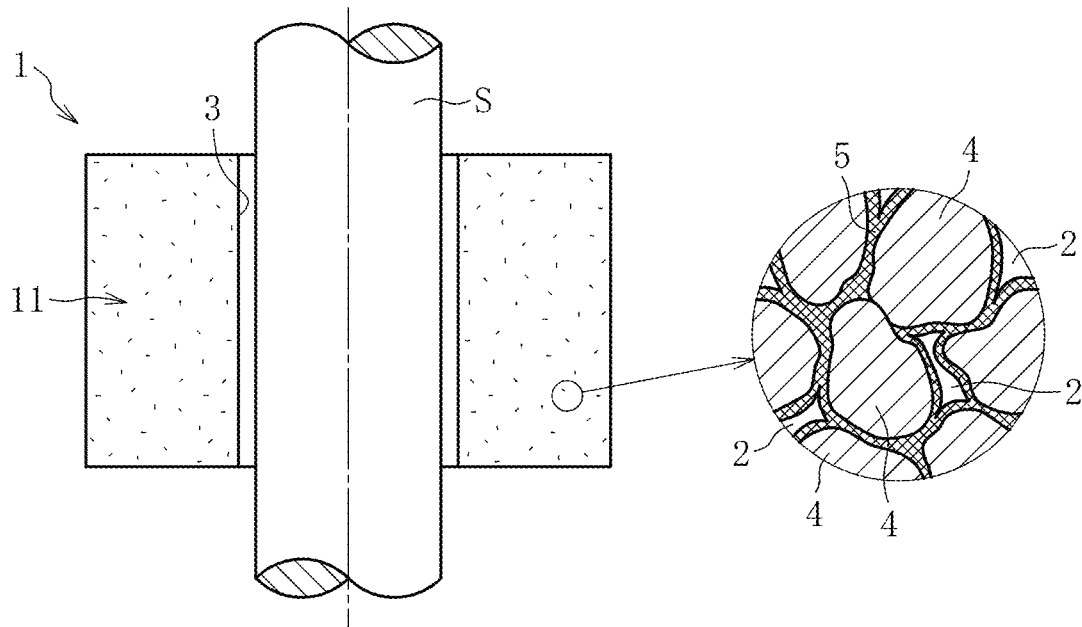
FIG. 1 is a schematic sectional view of a slide bearing that is one example of machine parts manufactured through application of a manufacturing method according to a first aspect of the present invention.

For example, as illustrated in FIG. 1, a method of manufacturing a machine part according to the first aspect of the present invention is applied to manufacturing of a slide bearing 1 configured to relatively rotatably support a shaft S inserted in an inner periphery in a radial direction, more specifically, manufacturing of the slide bearing 1 made of a porous metal having an infinite number of inner pores 2. The slide bearing 1 is used in a so-called oil-impregnated state in which the inner pores 2 are impregnated with lubricating oil. Thus, for example, when the shaft S is rotated, the lubricating oil held in the inner pores 2 of the slide bearing 1 seeps into a bearing gap (radial bearing gap) between a cylindrical inner peripheral surface (radial bearing surface 3) of the slide bearing 1 and an outer peripheral surface of the shaft S along with the rotation of the shaft S to form an oil film, and the shaft S is supported so as to be rotatable in the radial direction through intermediation of the oil film.

The slide bearing 1 is formed of a green compact of raw material powder comprising, as a main component, metal powder having a pure iron powder content ratio of 95 mass % or more (pure iron powder content ratio of 100 mass % in this embodiment), more specifically, as illustrated in an enlarged view of FIG. 1, a reinforced green compact 11 having an oxide coating 5 which is formed on a surface of each particle (Fe particle) 4 of the pure iron powder, with adjacent Fe particles 4 being bonded to each other, and the slide bearing 1 has a radial crushing strength of 120 MPa or more. Further, the slide bearing 1 has a significantly small level difference between a minute protrusion and a minute recess present in each surface, and the level difference between a protrusion and a recess at least on the radial bearing surface 3 is 3 μm or less. The "level difference between a protrusion and a recess" as used herein is a level difference between a minute protrusion and a minute recess (specifically, between a protrusion and a recess each derived mainly from variations in thickness of the oxide coating 5) which is inevitably caused in a manufacturing process for the slide bearing 1. Thus, the "level difference between a protrusion and a recess" means "cylindricity" defined in JIS B 0021 and does not encompass a level difference between a protrusion and a recess (dynamic pressure generating portion) that is intentionally formed on the radial bearing surface 3, for example, in order to generate a fluid dynamic pressure in the lubricating oil in the radial bearing gap. The slide bearing 1 is manufactured mainly through a compression molding step, a degreasing step, an oxide coating forming step, and an oil-impregnating step in the stated order. Each step is described in detail below.

[Compression Molding Step]

Figure 2A:
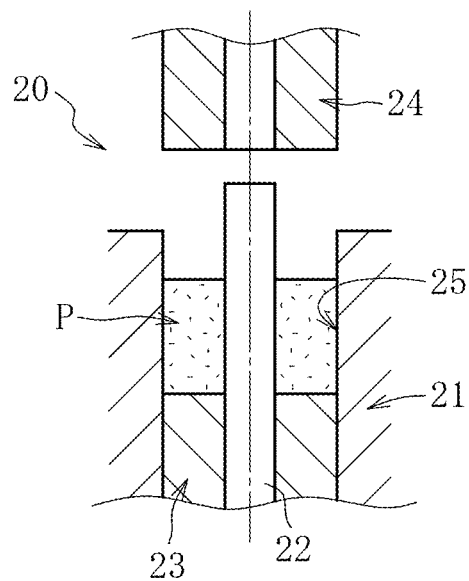
FIG. 2A is a sectional view for illustrating a state in which raw material powder is filled into a molding die used in a compression molding step performed when the slide bearing illustrated in FIG. 1 is manufactured.
Figure 2B:
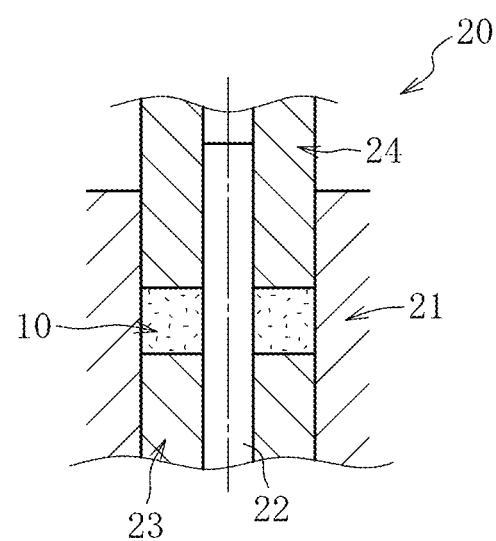
FIG. 2B is a sectional view for illustrating a state in which the raw material powder is subjected to compression molding in the molding die illustrated in FIG. 2A.

In the compression molding step, raw material powder is subjected to compression molding to obtain a green compact 10 in which particles constituting the raw material powder are brought into close contact with each other. The green compact 10 may be molded, for example, by a uniaxial press-molding method. Specifically, the green compact 10 is molded through use of a molding die device 20 as illustrated in FIG. 2A and FIG. 2B. The molding die device 20 comprises a die 21, a core pin 22, and a pair of a lower punch 23 and an upper punch 24. The die 21 has a cylindrical shape and is configured to mold an outer peripheral surface of the green compact 10. The core pin 22 is arranged along an inner periphery of the die 21 and is configured to mold an inner peripheral surface (bearing surface 3) of the green compact 10. The pair of the lower punch 23 and the upper punch 24 is configured to mold one end surface (lower end surface) and another end surface (upper end surface) of the green compact 10. The core pin 22, the lower punch 23, and the upper punch 24 are arranged coaxially with the die 21 so as to be movable relative to each other with respect to the die 21 in an axial direction (up-and-down direction).

In the die molding device 20 having the above-mentioned configuration, as illustrated in FIG. 2A, the lower punch 23 is first lowered under a state in which the core pin 22 is arranged along an inner periphery of the die 21 to define a cavity 25 with an inner peripheral surface of the die 21, an outer peripheral surface of the core pin 22, and an upper end surface of the lower punch 23. Then, a raw material powder P is filled into the cavity 25. When the upper punch 24 is lowered as illustrated in FIG. 2B to compress the raw material powder P filled in the cavity 25 in the axial direction, the green compact 10 having a cylindrical shape, in which a cylindrical surface to be the radial bearing surface 3 is molded on the inner peripheral surface, is obtained.

Herein, the raw material powder P is mixed powder which comprises, as a main component, metal powder capable of forming an oxide coating and is obtained by adding and mixing a predetermined amount of a solid lubricant (for example, a solid lubricant in an amount of 0.3 mass % or more and less than 3 mass %) to the metal powder. The metal powder has a pure iron powder content ratio of 95 mass % or more (in this embodiment, 100 mass %). When the solid lubricant is included in the raw material powder P, friction between Fe particles and friction between each of the Fe particles and the die can be reduced, thereby being capable of improving moldability and releasability of the green compact 10.

As the pure iron powder constituting the raw material powder P, pure iron powder produced by any production method can be used without problems. That is, for example, atomized iron powder produced by an atomizing method, such as gas atomizing or water atomizing, reduced iron powder produced by a reduction method, electrolytic iron powder produced by an electrolytic method, carbonyl iron powder produced by a carbonyl method, and the like may be used. Herein, the reduced iron powder suitable for obtaining the slide bearing 1 excellent in mechanical strength and oil-impregnation property is used. Further, although the particle diameter of the pure iron powder to be used is not particularly limited, it is preferred that the pure iron powder having an average particle diameter of 20 μm or more and 100 μm or less be used from the viewpoint of cost and moldability of the green compact 10.

As the solid lubricant (lubricant powder) to be added and mixed to the pure iron powder, for example, metal soap, such as aluminum stearate and zinc stearate, a fatty acid, a higher alcohol, glycerin, an ester, an amine and derivatives thereof, a wax such as a fatty acid amide, and various resins may be used. The exemplified solid lubricants may be used alone or in combination thereof. It is preferred that a solid lubricant which can be completely decomposed and removed at a treatment temperature of degreasing treatment performed in the degreasing step described later be selectively used.

The molding pressure of the raw material powder P is adjusted so that the green compact 10 having a density of 5.8 g/cm$^3$ or more and 7.2 g/cm$^3$ or less can be obtained. The green compact 10 having such density can be reliably obtained even by the uniaxial press-molding method employed in this embodiment. The uniaxial press-molding method has an advantage in that the green compact 10 can be obtained at low cost as compared to other press-molding methods (for example, molding through use of a multiaxial CNC press, a cold isostatic pressing method, and a hot isostatic pressing method) which can be used to obtain the green compact 10. As a matter of course, the molding through use of a multiaxial CNC press, the cold isostatic pressing method, the hot isostatic pressing method, and the like may be used in place of the uniaxial press-molding method to mold the green compact 10.

[Degreasing Step]

In the degreasing step, degreasing treatment for decomposing and removing the solid lubricant included in the green compact 10 is performed. The degreasing treatment is performed by heating the green compact 10 placed in a non-oxidizing gas atmosphere of an inert gas, a reducing gas, a vacuum, or the like at a temperature lower than the treatment temperature of coating forming treatment described later for a predetermined time period (for example, at 350° C. for 90 minutes). When the degreasing treatment is performed under such treatment conditions, a situation in which the oxide coating 5 is formed on the surfaces of the Fe particles 4 before the solid lubricant is sufficiently decomposed and removed, and as a result, the surface properties of the slide bearing 1 are degraded can be prevented to the extent possible.

[Oxide Coating Forming Step]

In this step, the Fe particles 4 constituting the green compact 10 are caused to react with an oxidizing gas while the green compact 10 placed in an oxidizing gas atmosphere (for example, in an atmosphere of an oxidizing gas, such as air or oxygen, or of a mixed gas of the oxidizing gas and an inert gas, such as nitrogen or argon) is heated at a temperature lower than the sintering temperature of the pure iron powder for a predetermined time period. With this, the oxide coating 5 is gradually formed on the surfaces of the Fe particles 4 constituting the green compact 10, and as the coating 5 grows, the reinforced green compact 11, in which the adjacent Fe particles 4 are bonded to each other through intermediation of the oxide coating 5, is obtained. The oxide coating 5 becomes a mixed phase of two or more kinds mainly selected from the group consisting of $Fe_3O_4$, $Fe_2O_3$, and FeO, and what kind of phase is formed varies depending on the treatment conditions of the coating forming treatment and the like.

Although depending on the shape and size of the green compact 10 to be treated, it is preferred that the specific treatment temperature and treatment time of the coating forming treatment be set to 350° C. or more and less than 700° C. and 10 minutes or more and 60 minutes or less, respectively. When the treatment temperature is less than 350° C. and/or the treatment time is less than 10 minutes, there is an increased risk in that the oxide coating 5 that can ensure the mechanical strength required for the slide bearing 1 cannot be formed. Meanwhile, when the treatment temperature is 700° C. or more, the oxide coating 5 formed by this treatment comprises so-called red rust as a main component. Therefore, the surface properties of the reinforced green compact 11 are degraded, and the cylindricity of 3 μm or less required particularly for the radial bearing surface 3 cannot be ensured. Further, when the treatment time of the coating forming treatment is more than 60 minutes, the oxide coating 5 stops growing, with the result that a strength improving effect on the green compact 10 (reinforced green compact 11) is saturated, and in addition, large cost is required for the coating forming treatment. In view of the foregoing, the treatment temperature of the coating forming treatment is set to 350° C. or more and less than 700° C., and the treatment time is set to 10 minutes or more and 60 minutes or less.

[Oil-Impregnating Step]

In this oil-impregnating step, the lubricating oil is impregnated into the inner pores 2 of the reinforced green compact 11 obtained through the above-mentioned oxide coating forming step. As an impregnating method for the lubricating oil, for example, vacuum impregnation may be employed. The oil-impregnating step is not always required and may be performed as required.

As described above, according to the present invention, the oxide coating 5 formed between the Fe particles 4 by the above-mentioned coating forming treatment functions as a bonding medium for the Fe particles 4 to replace a role of necking which is formed when the green compact is sintered. Thus, the strength of the green compact 10 (reinforced green compact 11) can be increased to a level of enabling direct use of the green compact 10 as the slide bearing 1, specifically, to a level having a radial crushing strength of 120 MPa or more. Further, the slide bearing 1 excellent in surface properties, in particular, the slide bearing 1 in which a level difference between a minute protrusion and a minute recess present on the radial bearing surface 3 (cylindricity on the radial bearing surface 3) is improved to less than 3 μm can be obtained by forming the oxide coating 5 through a reaction of the metal powder (pure iron powder) with the oxidizing gas instead of steam treatment of causing the metal powder to react with water vapor.

Further, by virtue of the presence of the oxide coating 5, the porosity of the reinforced green compact 11 becomes smaller than that of the green compact 10. Thus, when the reinforced green compact 11 is used as the slide bearing 1, the degradation in rigidity of the oil film formed in the radial bearing gap is prevented as much as possible without molding the green compact 10 with an irrelevantly increased density or without performing separate sealing treatment and the like on the green compact 10. As a result, the slide bearing 1 capable of stably exhibiting the desired bearing performance can be achieved.

Further, the coating forming treatment to be applied to the green compact 10 to form the oxide coating 5 involves a treatment temperature which is remarkably lower than a heating temperature in the case of sintering the green compact 10, thereby being capable of reducing the amount of change in dimension (dimension change ratio) in association with the treatment. Therefore, dimension correcting processing, such as sizing, which is essential after the sintering step when the green compact 10 is sintered, can also be omitted. Further, when the amount of change in dimension can be reduced, the molding die device 20 configured to mold the green compact 10 can be easily designed. Further, when the treatment temperature is low, energy required at the time of the treatment can also be reduced, thereby reducing treatment cost. As described above, according to the present invention, the slide bearing 1 having a mechanical strength, dimension accuracy, and surface properties at a level of enabling actual use can be manufactured at low cost.

As described above, the first aspect of the present invention is applied to the manufacturing of the slide bearing 1 configured to support a radial load (support the shaft S in the radial direction). However, the first aspect of the present invention can also be preferably applied to manufacturing of the slide bearing 1 configured to support both the radial load and a thrust load or the slide bearing 1 configured to support only the thrust load.

Figure 3:
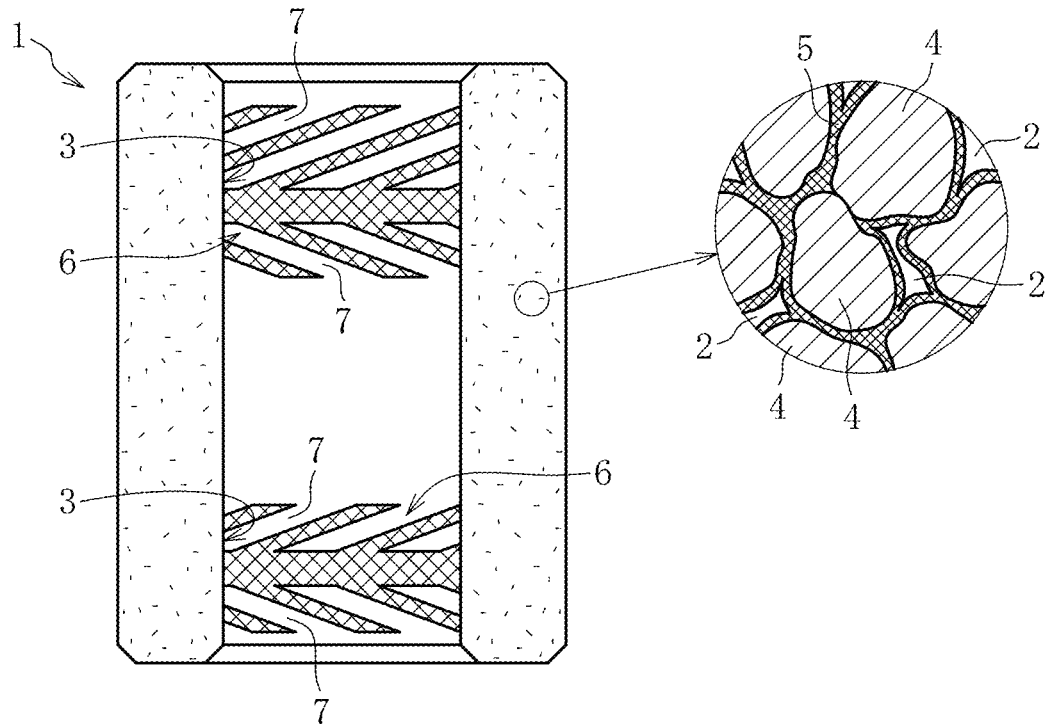
FIG. 3 is a schematic sectional view for illustrating a modification example of the slide bearing illustrated in FIG. 1.

Further, the first aspect of the present invention can also be applied to manufacturing of a so-called dynamic pressure bearing in which a dynamic pressure generating portion configured to generate a fluid dynamic pressure in the lubricating oil in the radial bearing gap is formed on the radial bearing surface 3. FIG. 3 is a view of one example of the slide bearing 1 (dynamic pressure bearing) in which the radial bearing surfaces 3 are formed in two locations separate from each other in the axial direction, and a dynamic pressure generating portion 6 is formed on each of the radial bearing surfaces 3. The dynamic pressure generating portion 6 in the illustrated example is formed of a plurality of dynamic pressure generating grooves 7 arranged in a herringbone shape. Although not shown, such dynamic pressure bearing is obtained, for example, by molding the green compact 10 through use of the core pin 22 (see FIG. 2) having a die portion corresponding to the shape of the dynamic pressure generating portion 6 on an outer peripheral surface in the compression molding step, and thereafter, subjecting the green compact 10 to the above-mentioned degreasing treatment and oxide coating forming treatment. The dynamic pressure generating portion 6 illustrated in FIG. 3 is merely an example, and the form of the dynamic pressure generating portion 6 is not particularly limited as long as the dynamic pressure generating portion 6 can generate a fluid dynamic pressure in the lubricating oil in the radial bearing gap. Further, although not shown, the present invention can also be preferably applied to manufacturing of the slide bearing 1 (dynamic pressure bearing) in which a dynamic pressure generating portion configured to generate a fluid dynamic pressure in lubricating oil in a thrust bearing gap is formed on a thrust bearing surface configured to support a thrust load.

Further, the first aspect of the present invention can also be preferably applied to manufacturing of other machine parts, such as a gear and a cam, without being limited to the slide bearing 1 described above.

Now, an embodiment of a second aspect of the present invention is described with reference to the drawings.

Figure 4:
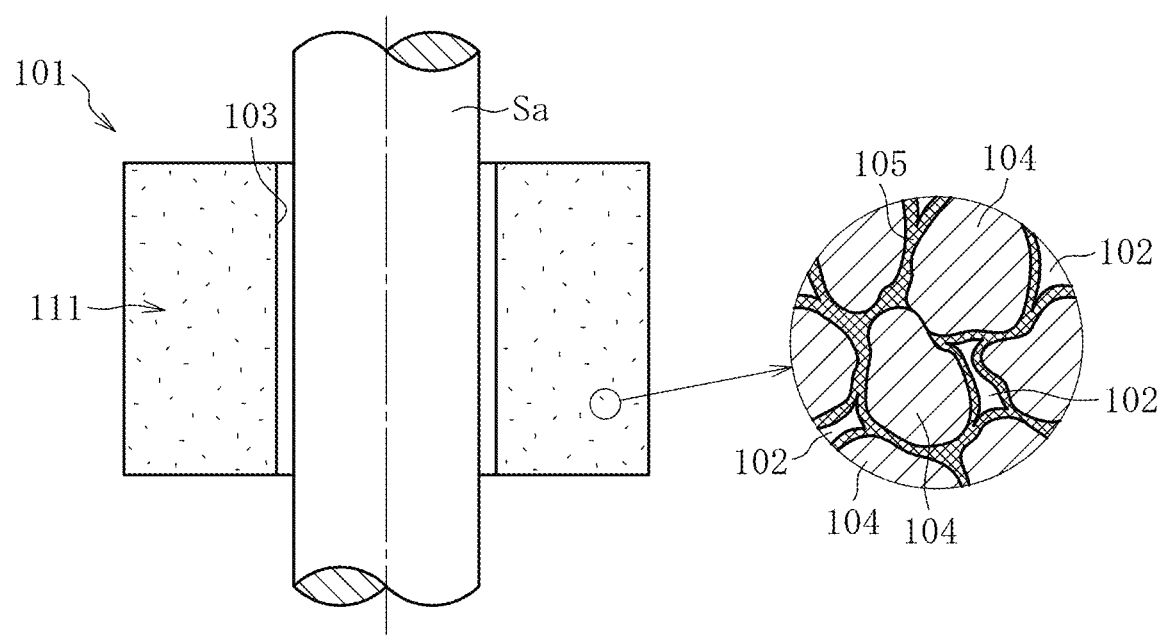
FIG. 4 is a schematic sectional view of a slide bearing that is one example of machine parts manufactured through application of a manufacturing method according to a second aspect of the present invention.

For example, as illustrated in FIG. 4, a method of manufacturing a machine part according to the second aspect of the present invention is applied to manufacturing of a slide bearing 101 configured to relatively rotatably support a shaft Sa inserted in an inner periphery in a radial direction, more specifically, manufacturing of the slide bearing 101 made of a porous metal having an infinite number of inner pores 102. The slide bearing 101 is used in a so-called oil-impregnated state in which the inner pores 102 are impregnated with lubricating oil. Thus, for example, when the shaft Sa is rotated, the lubricating oil held in the inner pores 102 of the slide bearing 101 seeps into a bearing gap (radial bearing gap) between a cylindrical inner peripheral surface (radial bearing surface 103) of the slide bearing 101 and an outer peripheral surface of the shaft Sa along with the rotation of the shaft Sa to form an oil film, and the shaft Sa is supported so as to be rotatable in the radial direction through intermediation of the oil film.

The slide bearing 101 is formed of a reinforced green compact 111 formed by subjecting a green compact of raw material powder comprising, as a main component, metal powder (for example, metal powder having a pure iron powder content ratio of 95 mass % or more) capable of forming an oxide coating to strength increasing treatment. As schematically illustrated in an enlarged view of FIG. 4, the slide bearing 101 formed of the reinforced green compact 111 has an oxide coating 105 which is formed on a surface of each Fe particle 104 (between the Fe particles 104), with adjacent Fe particles 104 being bonded to each other, and has a radial crushing strength of 120 MPa or more. Further, the slide bearing 101 has a significantly small level difference between a minute protrusion and a minute recess present in each surface, and the above-mentioned level difference between a protrusion and a recess at least on the radial bearing surface 103 is 3 μm or less. The "level difference between a protrusion and a recess" as used herein is a level difference between a minute protrusion and a minute recess (specifically, between a protrusion and a recess each derived mainly from variations in thickness of the oxide coating 105) which is inevitably caused in a manufacturing process for the slide bearing 101, and does not encompass a level difference between a protrusion and a recess (dynamic pressure generating portion) that is intentionally formed on the radial bearing surface 103, for example, in order to generate a fluid dynamic pressure in the lubricating oil in the radial bearing gap. Thus, the "level difference between a protrusion and a recess" as used herein means, in other words, "cylindricity" defined in JIS B 0021.

Figure 5:
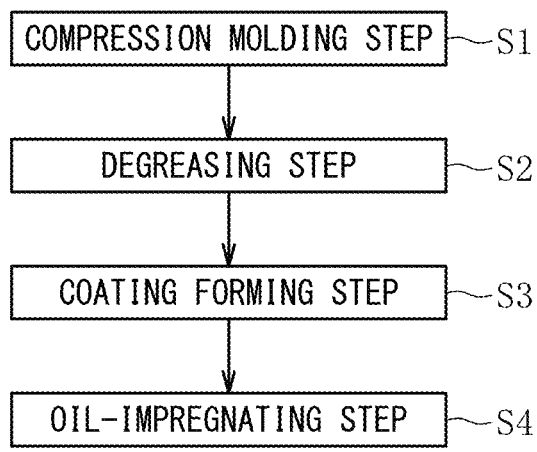
FIG. 5 is a flow diagram for illustrating manufacturing steps for the slide bearing illustrated in FIG. 4.

As illustrated in FIG. 5, the slide bearing 101 having the above-mentioned configuration is manufactured through a compression molding step S1, a degreasing step S2, a coating forming step S3, and an oil-impregnating step S4 in the stated order. Each step is described in detail below.

[Compression Molding Step]

Figure 6A:
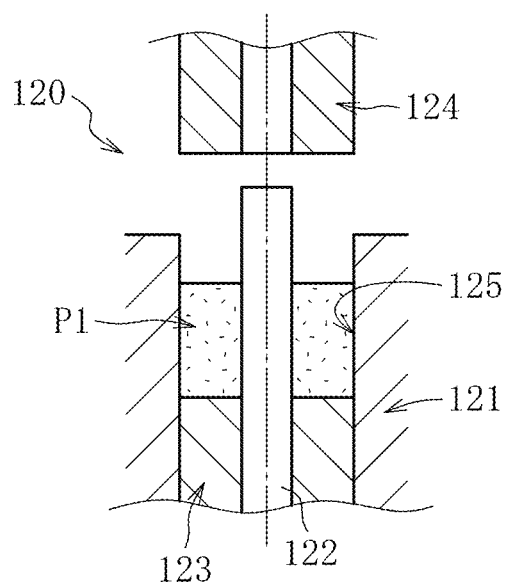
FIG. 6A is a sectional view for illustrating a state in which raw material powder is filled into a molding die used in a compression molding step performed when the slide bearing illustrated in FIG. 4 is manufactured.
Figure 6B:
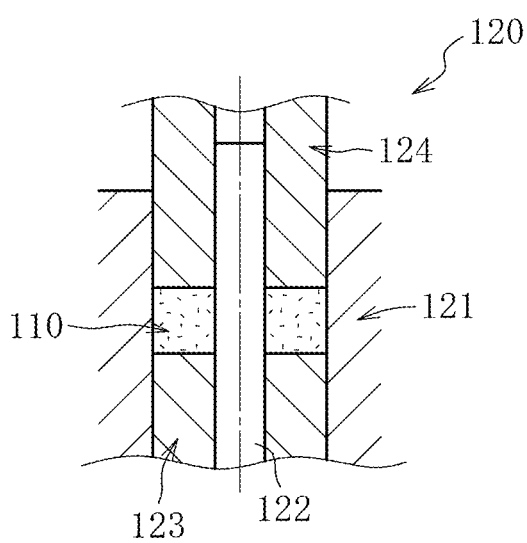
FIG. 6B is a sectional view for illustrating a state in which the raw material powder is subjected to compression molding in the molding die illustrated in FIG. 6A.

In the compression molding step S1, raw material powder is subjected to compression molding to obtain a green compact 110 in which particles constituting the raw material powder are brought into close contact with each other. The green compact 110 may be molded, for example, by a uniaxial press-molding method. Specifically, the green compact 110 is molded through use of a molding die device 120 as illustrated in FIG. 6A and FIG. 6B. The molding die device 120 comprises a die 121, a core pin 122, and a pair of a lower punch 123 and an upper punch 124. The die 121 has a cylindrical shape and is configured to mold an outer peripheral surface of the green compact 110. The core pin 122 is arranged along an inner periphery of the die 121 and is configured to mold an inner peripheral surface (bearing surface 103) of the green compact 110. The pair of the lower punch 123 and the upper punch 124 is configured to mold one end surface (lower end surface) and another end surface (upper end surface) of the green compact 110. The core pin 122, the lower punch 123, and the upper punch 124 are arranged coaxially with the die 121 so as to be movable relative to each other with respect to the die 121 in an axial direction (up-and-down direction).

In the die molding device 120 having the above-mentioned configuration, as illustrated in FIG. 6A, the lower punch 123 is first lowered under a state in which the core pin 122 is arranged along an inner periphery of the die 121 to define a cavity 125 with an inner peripheral surface of the die 121, an outer peripheral surface of the core pin 122, and an upper end surface of the lower punch 123. Then, a raw material powder P1 is filled into the cavity 125. When the upper punch 124 is lowered as illustrated in FIG. 6B to compress the raw material powder P1 filled in the cavity 125 in the axial direction, the green compact 110 having a cylindrical shape, in which the radial bearing surface 103 having a cylindrical shape is molded on the inner peripheral surface, is obtained.

Herein, the raw material powder P1 is mixed powder which comprises, as a main component, metal powder capable of forming an oxide coating and is obtained by adding and mixing a predetermined amount of a solid lubricant (for example, a solid lubricant in an amount of 0.3 mass % or more and less than 3 mass %) to the metal powder, and for example, metal powder having a pure iron powder content ratio of 95 mass % or more is selectively used as the metal powder. As the pure iron powder, pure iron powder produced by any production method can be used without problems. That is, for example, atomized iron powder produced by an atomizing method, such as gas atomizing or water atomizing, reduced iron powder produced by a reduction method, electrolytic iron powder produced by an electrolytic method, carbonyl iron powder produced by a carbonyl method, and the like may be used. Herein, the reduced iron powder suitable for obtaining the slide bearing 101 excellent in mechanical strength and oil-impregnation property is used. Further, although the particle diameter of the pure iron powder to be used is not particularly limited, it is preferred that the pure iron powder having an average particle diameter of 20 μm or more and 100 μm or less be used from the viewpoint of cost and moldability of the green compact 110.

As the above-mentioned metal powder, any metal powder capable of forming an oxide coating may be used. Besides the pure iron powder, for example, one kind or two or more kinds selected from the group consisting of iron-based alloy powder containing an alloy element, copper powder (copper-based alloy powder), aluminum alloy powder, and magnesium alloy powder may be used. Further, when the alloy powder is used, any of completely alloyed powder or partially alloyed powder may be used.

In this embodiment, as the solid lubricant, a solid lubricant satisfying all the following conditions is selectively used.

A solid lubricant which is formed of a basic element constituting an organic substance, specifically, an element selected from the group consisting of C, H, O, N, P, S, and halogen group elements, and is free of a metal component.

A solid lubricant which has a decomposition temperature of less than 500° C. (preferably 350° C.).

A solid lubricant which has a decomposition rate in the degreasing step S2 of 95% or more in mass fraction (95 mass % or more).

In general, the decomposition temperature tends to increase as a molecular weight (M) becomes larger and tends to decrease as the molecular weight becomes smaller. Therefore, the condition regarding a decomposition temperature may be replaced by the condition regarding a molecular weight as "molecular weight M of less than 600".

Examples of the solid lubricant which satisfies all of the above-mentioned conditions may include the following compounds.

Stearic acid amide (chemical formula: $C_{18}H_{37}NO$, M≈283, decomposition temperature≈250° C.)

Lauric acid amide (chemical formula: $C_{12}H_{25}NO$, M≈199, decomposition temperature≈300° C.)

Palmitic acid amide (chemical formula: $C_{16}H_{33}NO$, M≈255, decomposition temperature≈240° C.)

Behenic acid amide (chemical formula: $C_{22}H_{45}NO$, M≈339, decomposition temperature≈340° C.)

Ethylenebis capric acid amide (chemical formula: $C_{22}H_{44}N_2O_2$, M≈368, decomposition temperature≈370° C.)

Ethylenebis lauric acid amide (chemical formula: $C_{26}H_{52}N_2O_2$, M≈424, decomposition temperature≈400° C.)

Ethylenebis hydroxystearic acid amide (chemical formula: $C_{38}H_{76}N_2O_4$, decomposition temperature≈465° C.)

Erucic acid amide (chemical formula: $C_{22}H_{43}NO$, M≈337, decomposition temperature≈470° C.)

Conversely, as solid lubricants which do not satisfy any one of the above-mentioned conditions and are not intentionally used, there are given, for example, the following compounds.

Zinc stearate (∵ containing Zn serving as a metal component, decomposition temperature≈540° C.)

Calcium stearate (∵ containing Ca serving as a metal component, decomposition temperature≈500° C.)

Aluminum stearate (∵ containing Al serving as a metal component, decomposition temperature≈525° C.)

Ethylenebis stearic acid amide (∵ decomposition temperature≈600° C.)

Ethylenebis oleic acid amide (∵ decomposition temperature≈670° C.)

The molding pressure of the raw material powder P1 is adjusted so that the green compact 110 having a density of 5.8 g/cm³ or more and 7.2 g/cm³ or less can be obtained. The green compact 110 having such density can be reliably obtained even by the uniaxial press-molding method employed in this embodiment. The uniaxial press-molding method has an advantage in that the green compact 110 can be obtained at low cost as compared with other press-molding methods (for example, molding through use of a multiaxial CNC press, a cold isostatic pressing method, and a hot isostatic pressing method) which can be used to obtain the green compact 110. As a matter of course, the molding through use of a multiaxial CNC press, the cold isostatic pressing method, the hot isostatic pressing method, and the like may be used in place of the uniaxial press-molding method to mold the green compact 110.

[Degreasing Step]

In the degreasing step S2, degreasing treatment for decomposing and removing the solid lubricant included in the green compact 110 is performed. It is preferred that the degreasing treatment be performed by heating the green compact 110 placed in a non-oxidizing atmosphere of an inert gas, such as nitrogen, a reducing gas, a vacuum, or the like at a temperature equal to or higher than the decomposition temperature of the solid lubricant included in the green compact 110 for a predetermined time period. The degreasing treatment may also be performed in an atmosphere (for example, air) for oxidizing the metal powder capable of forming an oxide coating, such as pure iron powder included in the green compact 110.

Herein, as described above, in this embodiment, the solid lubricant having a decomposition rate in the degreasing step S2 of 95 mass % or more is selectively used. In other words, the treatment temperature and the treatment time of the degreasing treatment (heating temperature and heating time of the green compact 110) are set so that 95 mass % or more of the solid lubricant included in the green compact 110 can be decomposed. The reason for this is as follows. When a large amount of the solid lubricant (residue derived therefrom) remains in the green compact 110 after the degreasing treatment, the oxide coating 105 is formed on the surfaces of the Fe particles 104 while the solid lubricant is additionally decomposed and removed during the coating forming treatment in the coating forming step S3 described later. Therefore, the surface properties of the reinforced green compact 111 obtained by the coating forming treatment, and by extension, the surface properties of the slide bearing 101 are degraded. For the above-mentioned reason, in this embodiment, the use of a solid lubricant made of metal soap, such as zinc stearate, which contains a metal component and is liable to cause a large amount of a residue to remain in the green compact 110 even after the degreasing treatment is intentionally avoided, and the solid lubricant formed of a basic element constituting an organic substance is selectively used.

In general, the decomposition rate of the solid lubricant by the degreasing treatment can be increased by increasing the treatment temperature of the degreasing treatment and/or extending the treatment time of the degreasing treatment. However, as the treatment temperature of the degreasing treatment is increased, or as the treatment time of the degreasing treatment is extended, the energy consumption in the degreasing step S2 is uneconomically increased, and in addition, an expansion amount and a contraction amount of the green compact 110 in association with the degreasing treatment are increased, with the result that the shape (dimension) accuracy of the green compact 110, and by extension, the shape (dimension) accuracy of the slide bearing 101 are liable to be degraded. For the above-mentioned reason, in this embodiment, the solid lubricant satisfying all the above-mentioned conditions, for example, a solid lubricant formed of a saturated fatty acid amide, such as stearic acid amide or palmitic acid amide, is selectively used. When such solid lubricant is used, the treatment temperature and the treatment time of the degreasing treatment are set to, for example, 350° C. or less and 90 minutes or less, respectively.

[Coating Forming Step]

In the coating forming step S3, the Fe particles 104 constituting the green compact 110 are caused to react with an oxidizing gas while the green compact 110 placed in an oxidizing gas atmosphere (for example, in an oxidizing gas atmosphere of an oxidizing gas, such as air or oxygen, or a mixed gas atmosphere of the oxidizing gas and an inert gas, such as nitrogen or argon, with an oxygen fraction of 2 vol. % or more) is heated at a temperature lower than the sintering temperature of the metal powder (in this case, pure iron powder) for a predetermined time period. With this, the oxide coating 105 is gradually formed on the surfaces of the Fe particles 104 constituting the green compact 110, and as the coating 105 grows, the reinforced green compact 111, in which the adjacent Fe particles 104 are bonded to each other through intermediation of the oxide coating 105, is obtained. The oxide coating 105 becomes a mixed phase of two or more kinds mainly selected from the group consisting of $Fe_3O_4$, $Fe_2O_3$, and FeO, and what kind of phase is formed varies depending on the treatment conditions of the coating forming treatment and the like.

Although depending on the shape and size of the green compact 110 to be treated, it is preferred that the specific treatment temperature and treatment time of the coating forming treatment be set to 350° C. or more and less than 700° C. and 10 minutes or more and 60 minutes or less, respectively. When the treatment temperature is less than 350° C. and/or the treatment time is less than 10 minutes, there is an increased risk in that the oxide coating 105 that can ensure the mechanical strength required for the slide bearing 101 cannot be formed. Meanwhile, when the treatment temperature is 700° C. or more, the oxide coating 105 formed by this treatment comprises so-called red rust as a main component. Therefore, the surface properties of the reinforced green compact 111 are degraded, and the cylindricity of 3 μm or less required particularly for the radial bearing surface 103 cannot be ensured. Further, when the treatment time of the coating forming treatment is more than 60 minutes, the oxide coating 105 stops growing, with the result that a strength improving effect on the green compact 110 (reinforced green compact 111) is saturated, and in addition, large cost is required for the coating forming treatment. In view of the foregoing, the treatment temperature of the coating forming treatment is set to 350° C. or more and less than 700° C., and the treatment time is set to 10 minutes or more and 60 minutes or less.

[Oil-Impregnating Step]

In the oil-impregnating step S4, the lubricating oil is impregnated into the inner pores 102 of the reinforced green compact 111. As an impregnating method for the lubricating oil, for example, vacuum impregnation may be employed. The oil-impregnating step is not always required and may be performed as required.

As described above, according to the present invention, the oxide coating 105 formed between the Fe particles 104 by the above-mentioned coating forming treatment functions as a bonding medium for the Fe particles 104 to replace a role of necking which is formed when the green compact is sintered. Thus, the strength of the green compact 110 (reinforced green compact 111) can be increased to a level of enabling direct use of the green compact 110 as the slide bearing 101, specifically, to a level having a radial crushing strength of 120 MPa or more. Further, the slide bearing 101 excellent in surface properties, in particular, the slide bearing 101 in which the cylindricity on the radial bearing surface 103 is improved to less than 3 μm can be obtained by forming the oxide coating 105 through a reaction of the metal powder (pure iron powder) with the oxidizing gas instead of steam treatment of causing the metal powder to react with water vapor. Further, through selective use of the solid lubricant satisfying the above-mentioned various conditions as the solid lubricant to be included in the raw material powder P1, even when the degreasing treatment is performed at a low temperature capable of minimizing the energy consumption and the amount of change in dimension of the green compact 110 in association with the degreasing treatment, the solid lubricant can be appropriately decomposed and removed, and a residue derived from the solid lubricant can be prevented from remaining in the reinforced green compact 111. Also in this respect, the slide bearing 101 excellent in surface properties can be obtained.

Further, by virtue of the presence of the oxide coating 105, the porosity of the reinforced green compact 111 becomes smaller than that of the green compact 110. Thus, when the reinforced green compact 111 is used as the slide bearing 101, the degradation in rigidity of the oil film formed in the radial bearing gap is prevented as much as possible without molding the green compact 110 with an irrelevantly increased density or without performing separate sealing treatment and the like on the green compact 110. As a result, the slide bearing 101 capable of stably exhibiting the desired bearing performance can be achieved.

Further, the coating forming treatment to be applied to the green compact 110 to form the oxide coating 105 involves a treatment temperature which is remarkably lower than a heating temperature in the case of sintering the green compact 110, thereby being capable of reducing the amount of change in dimension (dimension change ratio) in association with the treatment. Therefore, dimension correcting processing, such as sizing, which is essential after the sintering step when the green compact 110 is sintered, can also be omitted. Further, when the amount of change in dimension can be reduced, the molding die device 120 configured to mold the green compact 110 can easily be designed. Further, when the treatment temperature is low, energy required at the time of the treatment can also be reduced, thereby reducing treatment cost.

As described above, according to the second aspect of the present invention, the slide bearing 101 having a mechanical strength, dimension accuracy, and surface properties at a level of enabling actual use can be manufactured at low cost.

As described above, the second aspect of the present invention is applied to manufacturing of the slide bearing 101 configured to support a radial load (support the shaft Sa in the radial direction). However, the second aspect of the present invention can also be preferably applied to manufacturing of the slide bearing 101 configured to support both the radial load and a thrust load or the slide bearing 101 configured to support only the thrust load.

Figure 7:
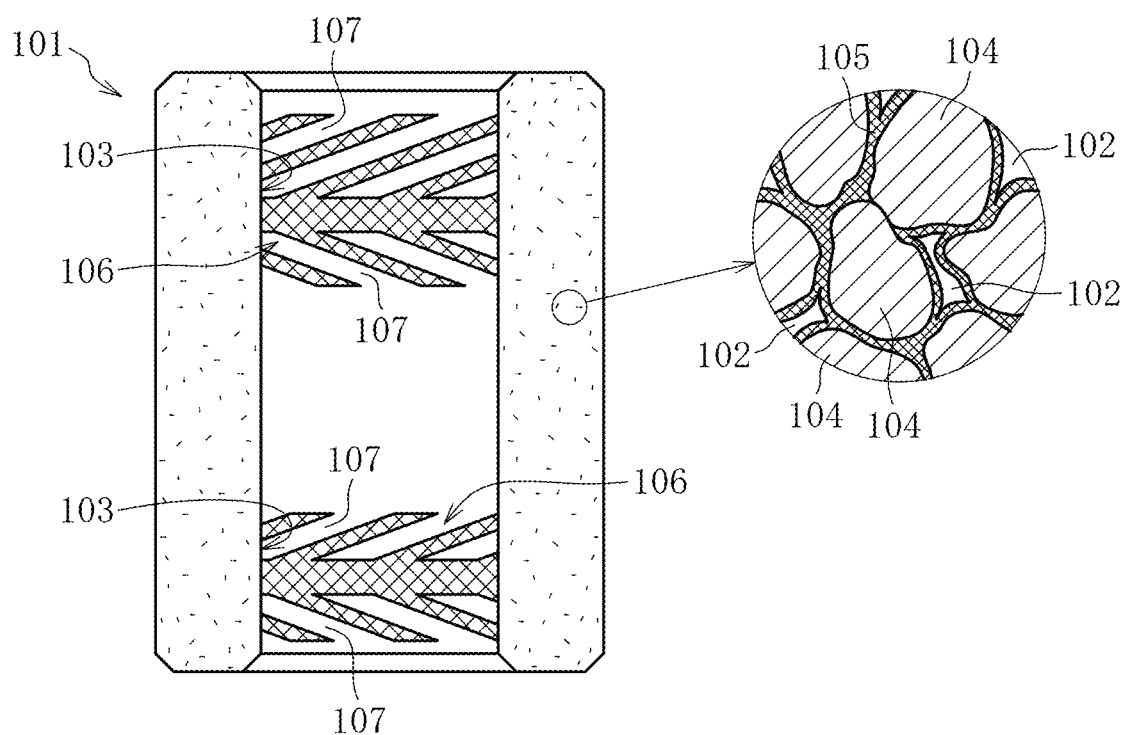
FIG. 7 is a schematic sectional view for illustrating a modification example of the slide bearing illustrated in FIG. 4.

Further, the second aspect of the present invention can also be applied to manufacturing of a so-called dynamic pressure bearing in which a dynamic pressure generating portion configured to generate a fluid dynamic pressure in the lubricating oil in the radial bearing gap is formed on the radial bearing surface 103. FIG. 7 is a view of one example of the slide bearing 101 (dynamic pressure bearing) in which the radial bearing surfaces 103 are formed in two locations separated from each other in the axial direction, and a dynamic pressure generating portion 106 is formed on each of the radial bearing surfaces 103. The dynamic pressure generating portion 106 in the illustrated example is formed of a plurality of dynamic pressure generating grooves 107 arranged in a herringbone shape. Although not shown, such dynamic pressure bearing is obtained, for example, by molding the green compact 110 through use of the core pin 122 (see FIG. 6) having a die portion corresponding to the shape of the dynamic pressure generating portion 106 on an outer peripheral surface in the compression molding step, and thereafter, subjecting the green compact 110 to the above-mentioned degreasing treatment and oxide coating forming treatment. The dynamic pressure generating portion 106 illustrated in FIG. 7 is merely an example, and the form of the dynamic pressure generating portion 106 is not particularly limited as long as the dynamic pressure generating portion 106 can generate a fluid dynamic pressure in the lubricating oil in the radial bearing gap.

Further, although not shown, the second aspect of the present invention can also be preferably applied to manufacturing of the slide bearing 101 (dynamic pressure bearing) in which a dynamic pressure generating portion configured to generate a fluid dynamic pressure in lubricating oil in a thrust bearing gap is formed on a thrust bearing surface configured to support a thrust load.

Further, the second aspect of the present invention can also be preferably applied to manufacturing of other machine parts, such as a gear and a cam, without being limited to the slide bearing 101 described above.

Example 1

In order to verify the usefulness of the first aspect of the present invention, the effects of each of (1) the density of a green compact, (2) the composition of metal powder (metal powder capable of forming an oxide coating. The same applies hereinafter.), (3) the implementation atmosphere of degreasing treatment, (4) the treatment temperature and time of coating forming treatment, and (5) the implementation atmosphere of the coating forming treatment on (A) a strength, (B) a dimension change ratio, and (C) surface properties of a machine part (machine part comprising the above-mentioned reinforced green compact 11 as a base material) were investigated and verified. In each test, a cylindrical test sample corresponding to the slide bearing 1 illustrated in FIG. 1 was used. Now, description is first made of evaluation methods and evaluation criteria for the above-mentioned evaluation items (A) to (C).

(A) Strength
[Evaluation Method]

A radial crushing strength [unit: MPa] of a test sample was measured and calculated based on a method defined in JIS Z 2507, and the strength of the test sample was evaluated in three stages: "⊙", "○", and "×" based on the radial crushing strength. The radial crushing strength as used herein is an average value of radial crushing strengths measured and calculated from three test samples manufactured under the same conditions.

[Evaluation Criteria]
"⊙": Radial crushing strength of 150 MPa or more
"○": Radial crushing strength of 120 MPa or more and less than 150 MPa
"×": Radial crushing strength of less than 120 MPa (B) Dimension Change Ratio
[Evaluation Method]

A dimension change ratio [unit: %] was calculated by measuring, through use of a bore gauge, an inner diameter dimension of a green compact obtained by subjecting raw material powder to compression molding and an inner diameter dimension of a reinforced green compact obtained by subjecting the green compact to degreasing treatment and oxide coating forming treatment, and the dimension change ratio was evaluated in three stages: "⊙", "○", and "×" based on the calculated value. The dimension change ratio as used herein is an average value of dimension change ratios calculated from three test samples manufactured under the same conditions. Further, the calculation equation of the dimensional change ratio is as described below.

"Dimension change ratio (G)"=[("Inner diameter dimension of green compact"−"Inner diameter dimension of reinforced green compact")/"Inner diameter dimension of reinforced green compact"]×100

[Evaluation Criteria]
"⊙": $-0.1\% \leq \sigma < 0$
"○": $-0.2\% \leq \sigma \leq -0.1\%$
"×": $\sigma < -0.2\%$ (C) Surface Properties
[Evaluation Method]

Three test samples manufactured under the same conditions were prepared. The contour shape in an axial direction of a radially inner surface at any four positions in a circumferential direction for each of the test samples was formed into data. Then, the height of a protrusion having the largest level difference from a reference line (largest protrusion height) in each of the contour shape data was recorded. The surface properties of the test samples were evaluated in three stages: "⊙", "○", and "×" based on the "largest protrusion height" having the largest value of a total of twelve "largest protrusion heights".

[Evaluation Criteria]
"⊙": largest protrusion height of less than 3 μm
"○": largest protrusion height of 3 μm or more and less than 7 μm
"×": largest protrusion height of 7 μm or more Now, description is made of embodiments and test results of each test.

(1) First Verification Test: Density of Green Compact

The effects of the density of the green compact on the strength, dimension change ratio, and surface properties of the above-mentioned machine part comprising the reinforced green compact 11 as a base material were investigated and verified. In order to perform this verification test, seven kinds of test samples (Examples 1 to 5 and Comparative Examples 1 and 2) were manufactured. The seven kinds of test samples were manufactured by the same procedure under the same conditions except that the molding pressures of raw material powders were varied so that the densities of the green compacts were made different from each other. The details thereof are as described below.

[Manufacturing Procedure of Test Sample]

First, 0.5 mass % of amide wax-based lubricant powder was added and mixed with respect to metal powder capable of forming an oxide coating (in this case, metal powder having a reduced pure iron powder content ratio of 100% in mass ratio) to obtain raw material powder. Then, the raw material powder was filled into a molding die made of SKD11 and subjected to compression molding to a predetermined density by a uniaxial press-molding method to obtain a cylindrical green compact. Then, the green compact was subjected to degreasing treatment and oxide coating forming treatment. The treatment conditions of the degreasing treatment were set to an atmosphere of a nitrogen gas, a heating temperature of 350° C., and a heating time of 90 minutes, and the treatment conditions of the coating forming treatment were set to an atmosphere of air, a heating temperature of 500° C., and a heating time of 10 minutes.

The density of each of the test samples verified and evaluated in this test and the evaluation results thereof are shown in Table 1 below. In the first verification test and second to fifth verification tests described later, a test sample which was evaluated as "×" even in any one of the above-mentioned evaluation items (A) to (C) was determined not to satisfy the required characteristics and not to be able to be actually directly used and hence was evaluated as "×" in overall evaluation. Meanwhile, in each of the tests, a test sample which was evaluated as "⊙" or "○" in all the above-mentioned evaluation items (A) to (C) was determined to be able to be actually directly used and hence was evaluated as "○" in overall evaluation.

TABLE 1

| Test sample | Density of green compact [g/cm³] | Radial crushing strength | Dimension change ratio | Surface properties | Overall evaluation |
|---|---|---|---|---|---|
| Example 1 | 5.8 | ○ | ○ | ○ | ○ |
| Example 2 | 6.0 | ⊙ | ⊙ | ⊙ | ○ |
| Example 3 | 6.5 | ⊙ | ⊙ | ⊙ | ○ |
| Example 4 | 7.0 | ⊙ | ○ | ○ | ○ |
| Example 5 | 7.2 | ○ | ○ | ○ | ○ |
| Comparative Example 1 | 5.5 | X | ○ | X | X |
| Comparative Example 2 | 7.4 | X | X | X | X |

As is apparent also from Table 1, when the density of the green compact is less than a predetermined level (Comparative Example 1), desired radial crushing strength and surface properties (cylindricity on a radially inner surface) cannot be ensured. Further, when the density of the green compact is more than the predetermined level (Comparative Example 2), desired radial crushing strength, dimension change ratio (shape accuracy), and cylindricity on the radially inner surface cannot be ensured. Thus, it is understood from the test results of the first verification test that the density of the green compact is set to preferably 5.8 g/cm³ or more and 7.2 g/cm³ or less, more preferably 6.0 g/cm³ or more and 6.5 g/cm³ or less.

(2) Second Verification Test: Composition of Metal Powder

The effects of the composition of the metal powder on (A) a strength, (B) a dimension change ratio, and (C) surface properties of the above-mentioned machine part comprising the reinforced green compact 11 as a base material were investigated and verified. In order to perform this verification test, four kinds of test samples (Examples 6 and 7 and Comparative Examples 3 and 4) were newly manufactured. The four kinds of newly manufactured test samples were manufactured by the same procedure under the same conditions as those of the test sample according to Example 3 manufactured in order to perform the first verification test except that the compositions of the metal powders were varied (mixed powder obtained by mixing reduced pure iron powder and a predetermined amount of electrolytic copper powder was used as each of the metal powders).

The composition of the powder for manufacturing each of the test samples verified and evaluated in this verification test, and the evaluation results thereof are shown in Table 2 below.

TABLE 2

| Test sample | Composition of metal powder | Density of green compact [g/cm³] | Radial crushing strength | Dimension change ratio | Surface properties | Overall evaluation |
|---|---|---|---|---|---|---|
| Example 3 | Fe alone | 6.5 | ◎ | ◎ | ◎ | ○ |
| Example 6 | Fe + 2% Cu | ↑ | ◎ | ○ | ◎ | ○ |
| Example 7 | Fe + 5% Cu | ↑ | ○ | ○ | ○ | ○ |
| Comparative Example 3 | Fe + 10% Cu | ↑ | ○ | ○ | X | X |
| Comparative Example 4 | Fe + 20% Cu | ↑ | ○ | ○ | X | X |

*[%] represents mass %.

As is apparent also from Table 2, it has been found that, as the content ratio of copper powder in the metal powder increases, the surface properties (cylindricity) on the radially inner surface of the test sample are significantly degraded, and in particular, when the content ratio of copper powder in the metal powder exceeds a predetermined level (Comparative Examples 3 and 4), cylindricity at a level of enabling use of the test sample as the slide bearing 1 cannot be ensured. The reason for this is mainly assumed as described below. The thickness of an oxide coating formed on the surfaces of Fe particles (growth speed of the coating) and the thickness of the oxide coating formed on the surfaces of Cu particles are different from each other. Thus, it is understood from the test results that it is preferred that metal powder having a pure iron powder content ratio of 95% or more be used, and it is particularly preferred that metal powder having a pure iron powder content ratio of 100% be used.

(3) Third Verification Test: Implementation Atmosphere of Degreasing Treatment

Next, the effects of the atmosphere for subjecting the green compact to degreasing treatment on (A) a strength, (B) a dimension change ratio, and (C) surface properties of the above-mentioned machine part comprising the reinforced green compact 11 as a base material were investigated and verified. In order to perform this verification test, four kinds of test samples (Examples 8 and 9 and Comparative Examples 5 and 6) were newly manufactured and prepared. The four kinds of newly manufactured test samples were manufactured by the same procedure under the same conditions as those of the test sample according to Example 3 except that the degreasing atmosphere was made different.

The degreasing atmosphere employed in order to manufacture each of the test samples is shown in Table 3 below together with the evaluation of each of the test samples.

TABLE 3

| Test sample | Degreasing atmosphere | Radial crushing strength | Dimension change ratio | Surface properties | Overall evaluation |
|---|---|---|---|---|---|
| Example 3 | Nitrogen | ◎ | ◎ | ◎ | ○ |
| Example 8 | Nitrogen + hydrogen | ◎ | ◎ | ◎ | ○ |
| Example 9 | Vacuum | ◎ | ◎ | ◎ | ○ |
| Comparative Example 5 | Air | ◎ | X | X | X |
| Comparative Example 6 | Oxygen | ◎ | X | X | X |

As is apparent also from Table 3, when the degreasing treatment on the green compact is performed in an oxidizing atmosphere of air, oxygen, or the like, shape accuracy and cylindricity on a radially inner surface at a level of enabling actual use of the green compact as the slide bearing 1 cannot be ensured. Thus, it is understood that it is preferred that the degreasing treatment on the green compact be performed in a non-oxidizing atmosphere of nitrogen or the like.

(4) Fourth Verification Test: Treatment Temperature and Time of Coating Forming Treatment The effects of the treatment temperature and treatment time of oxide coating forming treatment on (A) a strength, (B) a dimension change ratio, and (C) surface properties of the above-mentioned machine part comprising the reinforced green compact 11 as a base material were investigated and verified. In order to perform this verification test, six kinds of test samples (Examples 10 to 13 and Comparative Examples 7 and 8) were newly manufactured. The six kinds of newly manufactured test samples were manufactured by the same procedure under the same conditions as those of the test sample according to Example 3 except that the treatment conditions of the coating forming treatment were made different.

The treatment temperature and time of the coating forming treatment employed in order to manufacture each of the test samples are shown in Table 4 below together with the evaluation of each of the test samples.

TABLE 4

| Test sample | Heating temperature [° C.] | Heating time [min] | Radial crushing strength | Dimension change ratio | Surface properties | Overall evaluation |
|---|---|---|---|---|---|---|
| Example 3 | 500 | 10 | ◎ | ◎ | ◎ | ○ |
| Example 10 | ↑ | 30 | ◎ | ○ | ◎ | ○ |
| Example 11 | ↑ | 60 | ◎ | ○ | ○ | ○ |
| Example 12 | 350 | 10 | ○ | ◎ | ◎ | ○ |
| Example 13 | 600 | ↑ | ◎ | ○ | ◎ | ○ |
| Comparative Example 7 | 500 | 120 | ◎ | X | X | X |
| Comparative Example 8 | 700 | 10 | ◎ | X | X | X |

As is apparent also from Table 4, it is understood that, as the treatment temperature of the coating forming treatment is increased, or as the treatment time of the coating forming treatment is extended, the radial crushing strength of the test sample can be increased, but the dimension change ratio is increased and the surface properties are degraded. In particular, when the treatment temperature or the treatment time of the coating forming treatment exceeds a certain level, the dimension change ratio of the test sample is extremely increased, and the shape accuracy at a level of enabling use of the test sample as the slide bearing 1 cannot be ensured unless dimension correcting processing, such as sizing, is additionally performed. Further, when the treatment temperature of the coating forming treatment became too high, the surface properties were significantly degraded (Comparative Example 8). This is because the oxide coating formed in association with the coating forming treatment comprises red rust as a main component. Thus, from the test results, the treatment temperature of the coating forming treatment (heating temperature of the green compact) is preferably 350° C. or more and less than 700° C., more preferably 350° C. or more and 600° C. or less. Further, the treatment time of the coating forming treatment is preferably 10 minutes or more and 60 minutes or less.

(5) Fifth Verification Test: Implementation Atmosphere of Coating Forming Treatment The effects of the implementation atmosphere of the oxide coating forming treatment on (A) a strength, (B) a dimension change ratio, and (C) surface properties of the above-mentioned machine part comprising the reinforced green compact 11 as a base material were investigated and verified. In order to perform this verification test, four kinds of test samples (Example 14 and Comparative Examples 9 to 11) were newly manufactured. The four kinds of newly manufactured test samples were manufactured by the same procedure under the same conditions as those of the test sample according to Example 3 except that the implementation atmosphere of the coating forming treatment was made different.

The implementation atmosphere of the coating forming treatment employed in order to manufacture each of the test samples is shown in Table 5 below together with the evaluation results of each of the test samples.

TABLE 5

| Test sample | Implementation atmosphere of coating forming treatment | Radial crushing strength | Dimension change ratio | Surface properties | Overall evaluation |
|---|---|---|---|---|---|
| Example 3 | Air | ◎ | ◎ | ◎ | ○ |
| Example 14 | Oxygen | ◎ | ○ | ◎ | ○ |
| Comparative Example 9 | Vacuum | X | ◎ | ◎ | X |
| Comparative Example 10 | Nitrogen | X | ◎ | ◎ | X |
| Comparative Example 11 | Water vapor | ◎ | ○ | X | X |

As is apparent also from Table 5, when the coating forming treatment was performed in a non-oxidizing atmosphere of a vacuum, nitrogen, or the like, desired radial crushing strength was not able to be ensured, and when the coating forming treatment was performed in the presence of water vapor (in short, so-called steam treatment was employed as the coating forming treatment), the surface properties were unsatisfactory, and quality enabling direct actual use as the slide bearing was not able to be ensured.

It is understood from the above-mentioned verification test results that the first aspect of the present invention is significantly useful for enabling a machine part made of a porous metal having desired mechanical strength, dimension accuracy, surface properties, and the like to be manufactured at low cost.

Example 2

In order to verify the usefulness of the second aspect of the present invention, a plurality of kinds of solid lubricants were prepared, and for each of the solid lubricants, tests for investigating and verifying (1) a decomposition rate, (2) presence or absence of a residue after the degreasing treatment, and (3) presence or absence of a residue after the coating forming treatment were performed.

(1) Decomposition Rate of Solid Lubricant

Figure 13:
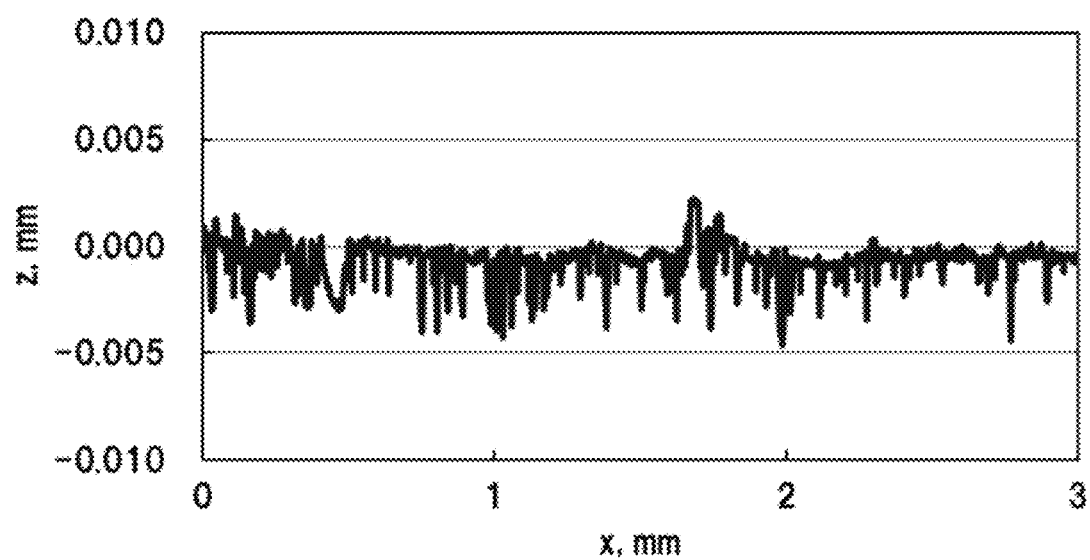
FIG. 13 is a chart of the surface contour shape of Comparative Example 13.

First, in order to investigate and verify the decomposition rate of a solid lubricant, 0.2 g of each of the solid lubricants was loaded in a container for analysis made of Al, and the solid lubricant was subjected to degreasing treatment in any of an inert atmosphere (pure nitrogen atmosphere), a reducing atmosphere (mixed atmosphere of nitrogen and hydrogen), or a vacuum atmosphere. The kind, degreasing conditions, and weight reduction rate (decomposition rate) of each of the solid lubricants to be investigated, and determination of acceptance based on the weight reduction rate are shown together in Table 6 below. The determination of acceptance was performed as follows: a case of having a weight reduction rate of less than 95 mass % was evaluated as "x"; a case of having a weight reduction rate of 95 mass % or more and less than 98 mass % was evaluated as "○";

FIG. 13 is a chart of the surface contour shape of Comparative Example 13. and a case of having a weight reduction rate of 98 mass % or more was evaluated as "◎".

TABLE 6

| Solid lubricant | Decomposition temperature [° C.] | Degreasing conditions [° C. × min] | Degreasing atmosphere | Weight reduction rate [mass %] | Determination |
|---|---|---|---|---|---|
| Stearic acid amide | 250 | 350 × 90 | Inert | 100 | ⊚ |
| Lauric acid amide | 300 | ↑ | ↑ | 97 | ○ |
| Palmitic acid amide | 240 | ↑ | ↑ | 98 | ⊚ |
| Behenic acid amide | 340 | ↑ | ↑ | 98 | ⊚ |
| Lauric acid amide | 300 | 500 × 90 | Inert | 98 | ⊚ |
| ↑ | ↑ | 350 × 90 | Reducing | 99 | ⊚ |
| ↑ | ↑ | ↑ | Vacuum | 99 | ⊚ |
| Ethylenebis stearic acid amide | 600 | 350 × 90 | Inert | 42 | X |
| ↑ | ↑ | 500 × 90 | ↑ | 92 | X |
| Zinc stearate | 540 | ↑ | ↑ | 75 | X |
| Calcium stearate | 500 | ↑ | ↑ | 85 | X |

As is apparent also from Table 6, the solid lubricant having a high decomposition temperature and the metal soap-based solid lubricant were not sufficiently decomposed even by the degreasing treatment (weight reduction rate was low) and caused a large amount of a residue. Further, it is understood that, even with the solid lubricant having a low decomposition temperature and a high decomposition rate by the degreasing treatment, it is more advantageous to perform the degreasing treatment in a reducing atmosphere or a vacuum atmosphere rather than in an inert atmosphere in order to increase the decomposition rate of the solid lubricant to reduce a residue and enhance the surface properties of a machine part.

(2) Presence or Absence of Residue of Solid Lubricant after Degreasing Treatment This verification test was performed by manufacturing test samples according to Example 15 and Comparative Examples 12 and 13 by the following procedure and then observing the surface of each of the test samples with a scanning electron microscope (SEM) S-3000N manufactured by Hitachi High-Technologies Corporation. Further, the surface contour shape of each of the test samples was measured through use of a surface texture measuring instrument CS-H5000CNC manufactured by Mitsutoyo Corporation. The manufacturing procedure of each of the test samples is as described below.

Example 15

Raw material powder obtained by adding and mixing 0.5 mass % of stearic acid amide as a solid lubricant with respect to reduced iron powder was subjected to compression molding to obtain a cylindrical green compact having a density of 6.7 g/cm$^3$. After that, the green compact was subjected to degreasing treatment at 350° C. for 90 minutes. The implementation atmosphere of the degreasing treatment was set to an inert atmosphere (pure nitrogen atmosphere).

Comparative Example 12

A test sample according to this comparative example was the same as that according to Example 15 except that the solid lubricant was changed to ethylenebis stearic acid amide.

Comparative Example 13

A test sample according to this comparative example was the same as that according to Example 15 except that the solid lubricant was changed to ethylenebis stearic acid amide, and the treatment conditions of the degreasing treatment were changed to 500° C.×90 minutes.

The observation photograph and the measurement result of the surface contour shape of each of the test samples are shown in Table 7. In this test, a test sample in which a residue was observed was evaluated as "x", and a test sample in which a residue was not observed was evaluated as "○".

TABLE 7

Figure 9:
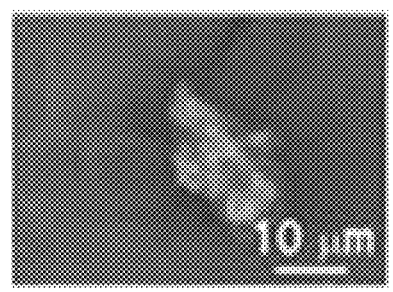
FIG. 9 is a SEM photograph of the surface of Comparative Example 12.
Figure 10:
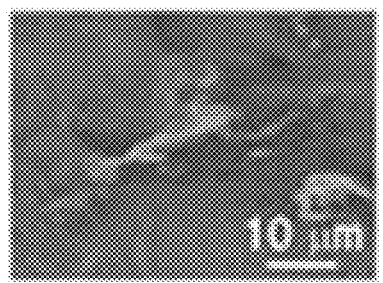
FIG. 10 is a SEM photograph of the surface of Comparative Example 13.
Figure 11:
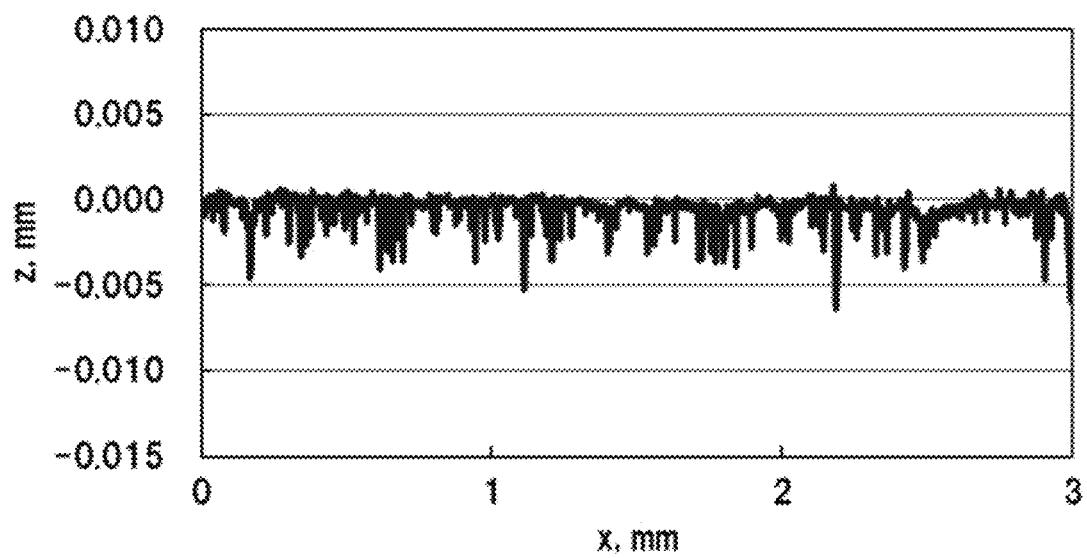
FIG. 11 is a chart of the surface contour shape of Example 15.
Figure 12:
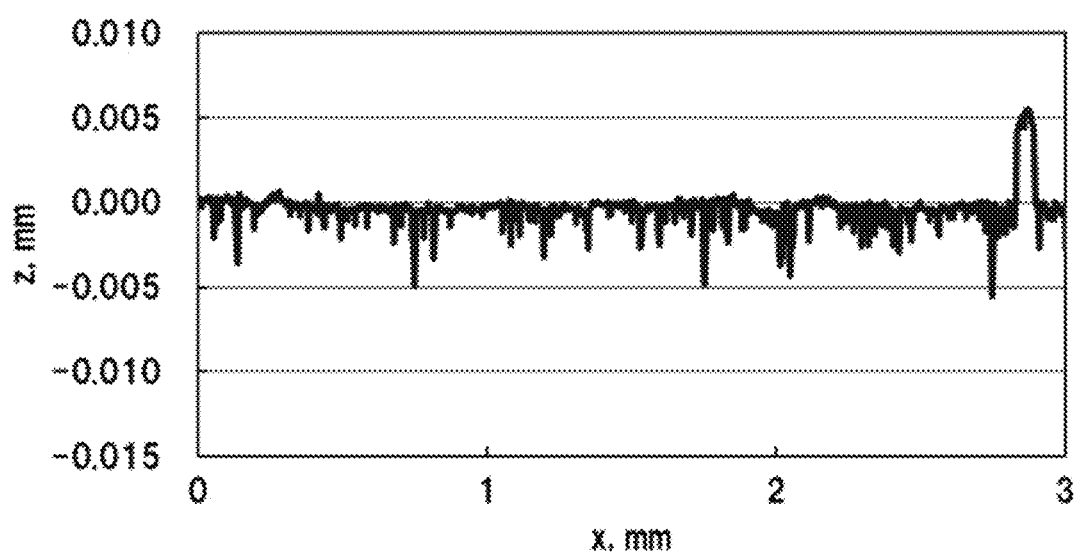
FIG. 12 is a chart of the surface contour shape of Comparative Example 12.

| Test sample | Solid lubricant | Degreasing conditions [° C. × min] | SEM photograph of surface (presence or absence of residue) | Surface contour shape | Determination |
|---|---|---|---|---|---|
| Example 15 | Stearic acid amide | 350 × 90 | Not observed | See FIG. 11 | ○ |
| Comparative Example 12 | Ethylenebis stearic acid amide | ↑ | See FIG. 9 | See FIG. 12 | X |
| Comparative Example 13 | ↑ | 500 × 90 | See FIG. 10 | See FIG. 13 | X |

As is apparent also from Table 7, in the test sample according to Example 15, no residue derived from the solid lubricant was observed on the surface. Meanwhile, in each of the test samples according to Comparative Examples 12 and 13, an organic substance charged up to white with an electron beam of an SEM was observed on the surface. In the raw material powder used for manufacturing each of the test samples according to Comparative Examples 12 and 13, an organic substance other than the solid lubricant was not added or mixed, and hence the above-mentioned organic substance was considered as a residue of the solid lubricant. Further, it is understood from the measurement results of the surface contour shapes of the test samples shown in Table 7 that the test sample according to Example 15, in which no residue was observed on the surface, had satisfactory surface properties as compared to each of the test samples according to Comparative Examples 12 and 13, in which a residue was observed on the surface. Thus, it is understood that it is important to selectively use a solid lubricant having a high decomposition rate (decomposition rate by the degreasing treatment) for obtaining a machine part made of a porous metal excellent in surface properties.

(3) Presence or Absence of Residue of Solid Lubricant after Coating Forming Treatment This verification test was performed by manufacturing a reinforced green compact having an oxide coating formed between Fe particles by heating each of the test samples (green compacts after being subjected to the degreasing treatment) according to Example 15 and Comparative Example 12 at 500° C. for 10 minutes in the air and then observing the surface of each of the reinforced green compacts.

Figure 8A:
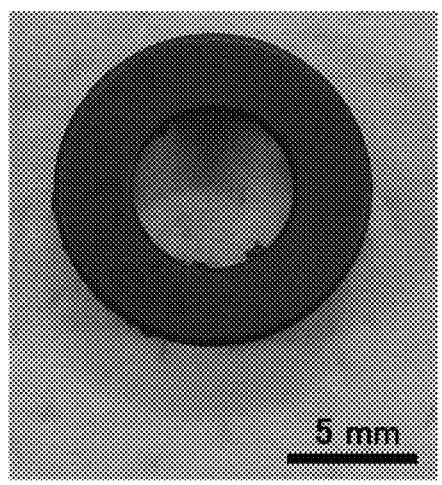
FIG. 8A is an enlarged photograph of a test sample according to Comparative Example manufactured in a verification test.
Figure 8B:
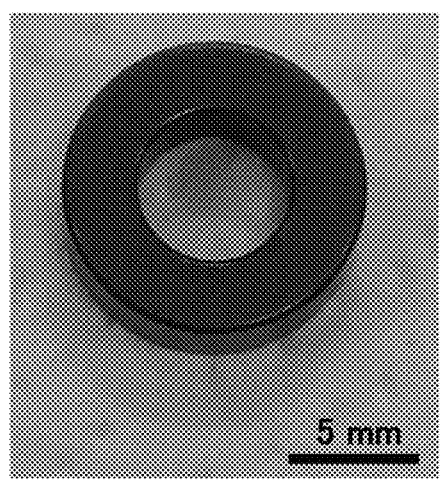
FIG. 8B is an enlarged photograph of a test sample according to Example manufactured in the verification test.

First, in the reinforced green compact obtained by subjecting the test sample according to Comparative Example 12 to coating forming treatment, a soot-like residue was observed on the surface as shown in FIG. 8A. The reason for this is assumed as described below. This reinforced green compact comprises, as a base material, the test sample according to Comparative Example 12, in which the solid lubricant was not sufficiently decomposed or removed even by the degreasing treatment, and hence the decomposition and expression of the solid lubricant occurred also during the coating forming treatment. Meanwhile, in the reinforced green compact obtained by subjecting the test sample according to Example 15 to the coating forming treatment, no residue was observed on the surface as shown in FIG. 8B, and the reinforced green compact had excellent surface properties. The reason for this is easily assumed as described below. The reinforced green compact comprises, as a base material, the test sample according to Example 15, in which the solid lubricant was sufficiently decomposed and removed by the degreasing treatment.

It is understood from the above-mentioned verification test results that it is important to specify the kind of the solid lubricant to be added and mixed with respect to the metal powder, in particular, for enabling a machine part made of a porous metal excellent in surface properties to be manufactured at low cost. Thus, the second aspect of the present invention can be said to be significantly useful for enabling a machine part made of a porous metal having desired mechanical strength, dimension accuracy, surface properties, and the like to be manufactured at low cost.

REFERENCE SIGNS LIST 1 slide bearing
2 inner pore
3 radial bearing surface
4 Fe particle
5 oxide coating
10 green compact
11 reinforced green compact
20 molding die device
101 slide bearing
102 inner pore
103 radial bearing surface
104 Fe particle
105 oxide coating
110 green compact
111 reinforced green compact
120 molding die device
P raw material powder
P1 raw material powder
S shaft
Sa shaft
S1 compression molding step
S2 degreasing step
S3 coating forming step
S4 oil-impregnating step

The invention claimed is:

1. A method of manufacturing a machine part having a radial crushing strength of 120 MPa or more, the method comprising:
   a compression molding step of compressing raw material powder comprising, as a main component, metal powder that is capable of forming an oxide coating and has a pure iron powder content ratio of 95% or more in mass ratio, to thereby obtain a green compact having a cylindrical shape, in which a cylindrical radial bearing surface for rotatably supporting a shaft in a radial direction is molded on an inner peripheral surface; and
   a coating forming step of causing the metal powder to react with an oxidizing gas without reacting with water vapor while heating the green compact at a temperature lower than a sintering temperature of the metal powder in the oxidizing gas atmosphere, to thereby obtain a reinforced green compact in which the oxide coating is formed between particles of the metal powder,
   wherein the cylindrical radial bearing surface of the reinforced green compact obtained through the compression molding step and the coating forming step has a cylindricity defined in JIS B 0021 of 3 μm or less.

2. The method of manufacturing a machine part according to claim 1,
   wherein the raw material powder comprises a solid lubricant, and
   wherein the method further comprises, between the compression molding step and the coating forming step, a degreasing step of removing the solid lubricant included in the green compact, the degreasing step being performed in a non-oxidizing atmosphere.

3. A method of manufacturing a machine part made of a porous metal, the method comprising:
   a compression molding step of compressing raw material powder comprising: as a main component, metal powder that is capable of forming an oxide coating; and a solid lubricant, to thereby obtain a green compact having a cylindrical shape, in which a cylindrical radial bearing surface for rotatably supporting a shaft in a radial direction is molded on an inner peripheral surface;
   a degreasing step of removing the solid lubricant included in the green compact; and a coating forming step of causing the metal powder to react with an oxidizing gas without reacting with water vapor while heating the green compact after being subjected to degreasing treatment at a temperature lower than a sintering temperature of the metal powder in the oxidizing gas atmosphere, to thereby obtain a reinforced green compact in which the oxide coating is formed between particles of the metal powder, wherein the solid lubricant is a fatty acid amide that is free of a metal component and formed of an element selected from the group consisting of C, H, O, N, P, S, and halogen group elements, has a decomposition temperature of less than 500° C., and has a decomposition rate in the degreasing step of 95% or more in mass fraction, to thereby obtain the reinforced green compact having the cylindrical radial bearing surface with a cylindricity defined in JIS B 0021 of 3 μm or less.

4. The method of manufacturing a machine part according to claim 3, wherein the degreasing step is performed in a non-oxidizing atmosphere.

5. The method of manufacturing a machine part according to claim 1, wherein the compression molding step comprises obtaining the green compact having a density of 5.8 g/cm$^3$ or more and 7.2 g/cm$^3$ or less.

6. The method of manufacturing a machine part according to claim 1, wherein the coating forming step comprises setting a heating temperature of the green compact to 350° C. or more and less than 700° C.

7. The method of manufacturing a machine part according to claim 1, wherein the coating forming step comprises setting treatment time to 60 minutes or less.

8. The method of manufacturing a machine part according to claim 1, further comprising an oil-impregnating step of impregnating lubricating oil into inner pores of the reinforced green compact.

9. The method of manufacturing a machine part according to claim 1, wherein the cylindrical radial bearing surface comprises a dynamic pressure generating portion formed through die molding.

10. The method of manufacturing a machine part according to claim 3, wherein the compression molding step comprises obtaining the green compact having a density of 5.8 g/cm$^3$ or more and 7.2 g/cm$^3$ or less.

11. The method of manufacturing a machine part according to claim 3, wherein the coating forming step comprises setting a heating temperature of the green compact to 350° C. or more and less than 700° C.

12. The method of manufacturing a machine part according to claim 3, wherein the coating forming step comprises setting treatment time to 60 minutes or less.

13. The method of manufacturing a machine part according to claim 3, further comprising an oil-impregnating step of impregnating lubricating oil into inner pores of the reinforced green compact.

14. The method of manufacturing a machine part according to claim 3, wherein the cylindrical radial bearing surface comprises a dynamic pressure generating portion formed through die molding.

* * * * *